United States Patent
Saruwatari et al.

(10) Patent No.: US 6,292,455 B1
(45) Date of Patent: Sep. 18, 2001

(54) DISK DRIVE APPARATUS WITH ELASTIC DAMPERS

(75) Inventors: Kiyonari Saruwatari, Kadoma; Kiyoshi Umesaki, Neyagawa; Yoshikazu Yamano, Osaka; Makoto Kanbayashi, Neyagawa, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/340,128

(22) Filed: Jun. 28, 1999

(30) Foreign Application Priority Data

Jun. 30, 1998 (JP) ................................................ 10-183749

(51) Int. Cl.$^7$ .................................................. G11B 33/08
(52) U.S. Cl. ............................................................ 369/263
(58) Field of Search ................................ 369/263, 44.15, 369/247, 75.1; 360/97.02; 248/632, 634, 635, 638; 411/542, 544, 970, 979

(56) References Cited

U.S. PATENT DOCUMENTS

| | | | |
|---|---|---|---|
| 4,384,750 | * | 5/1983 | Hager ........................................ 312/8 |
| 4,794,588 | * | 12/1988 | Yoshitoshi et al. .................. 369/263 |
| 4,841,499 | * | 6/1989 | Takahashi et al. ...................... 369/38 |
| 5,337,864 | * | 8/1994 | Sjostrom .............................. 188/378 |
| 5,598,306 | * | 1/1997 | Frees et al. ....................... 360/97.02 |
| 5,663,843 | * | 9/1997 | Ezawa et al. .......................... 359/824 |
| 5,668,791 | * | 9/1997 | Yamada et al. ....................... 369/247 |
| 5,675,456 | * | 10/1997 | Myers et al. .......................... 369/106 |
| 5,687,149 | * | 11/1997 | Meunier .................................. 369/54 |
| 5,721,457 | * | 2/1998 | Sri-Jayantha et al. ............... 307/119 |
| 5,737,304 | | 4/1998 | Soga et al. ........................... 369/247 |
| 5,745,471 | * | 4/1998 | Son et al. .............................. 369/263 |
| 5,768,249 | * | 6/1998 | Ro et al. ............................... 369/263 |
| 5,784,351 | * | 7/1998 | Takagi ................................. 369/77.2 |
| 5,812,346 | * | 9/1998 | Williams et al. ..................... 360/105 |
| 5,858,509 | * | 1/1999 | Potch et al. ........................... 428/166 |

FOREIGN PATENT DOCUMENTS

| | | |
|---|---|---|
| 1-92984 | 4/1989 | (JP) . |
| 2-61881 | 3/1990 | (JP) . |
| 3-234940 | 10/1991 | (JP) . |

* cited by examiner

*Primary Examiner*—William Klimowicz
*Assistant Examiner*—Tianjie Chen
(74) *Attorney, Agent, or Firm*—Wenderoth Lind & Ponack, L.L.P.

(57) ABSTRACT

A disk drive unit 1 includes fixed and movable frames, 4 and 5. The movable frame has a turntable 20 for rotatably supporting the disk 15, an optical head 18 for optically reading information recorded in one surface of the disk supported on the turntable, and a guide 17 for moving the optical head in a radial direction of the supported disk. A support mechanism 12 for movably supporting the movable frame on the fixed frame has a damper 30 made of elastic material and is designed to have a specific damping feature with respect to first to third directions.

7 Claims, 20 Drawing Sheets

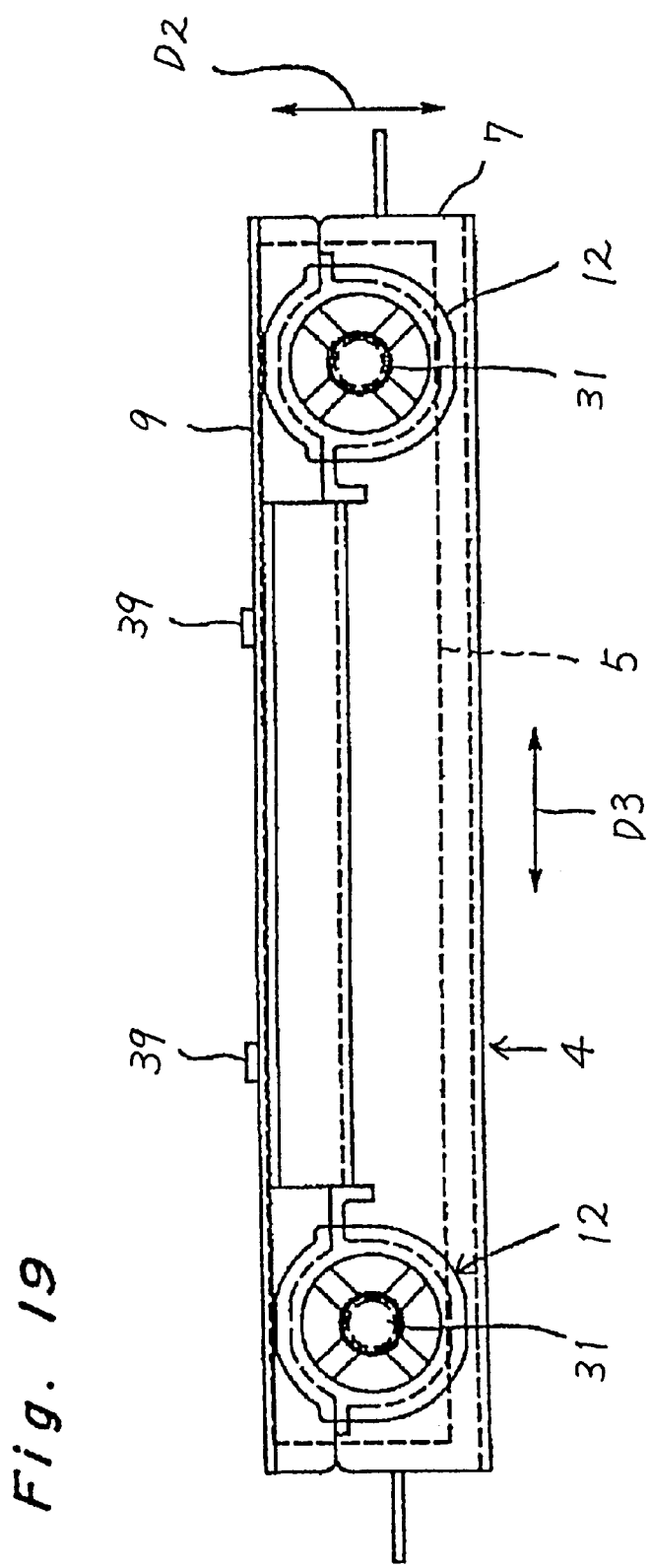

DISK DRIVE APPARATUS WITH ELASTIC DAMPERS

FIELD OF THE INVENTION

The present invention relates to a disk drive apparatus for optically picking up information recorded in a surface of an information bearing disk such as an optical disk. In particular, the present invention relates to a disk drive apparatus capable of picking up information recorded in an information bearing disk without any replay defect or interruption even when it is subject to vibrations and shocks. Also, the present invention relates to a disk drive apparatus preferably mounted in an automobile. Further, the present invention relates to a damping device having an elastic damper for use in a disk drive apparatus for an automobile, capable of effectively reducing vibrations and shocks transmitted during driving from a body of the automobile to an optical reading head of the disk drive apparatus.

BACKGROUND OF THE INVENTION

A disk drive unit particularly mounted in an automobile should be designed so that no replay defect or interruption would occur even when it is subject to vibrations and shocks occurring during driving of the automobile. To this end, a variety of countermeasures have been developed and proposed so far in the art. For example, one conventional disk drive unit for automobiles overcomes this problem by a signal processing approach. In this approach, information having been read out from the disk is compressed and then stored in a memory. The stored information is then decompressed for replay. When information recorded in one record block fails to be read due to shocks or vibrations, another try for reading the information is made again to the same record block during which information already stored in the memory would be replayed to prevent the replay interruption.

Another approach to overcome the problem is a mechanical solution that employs an elastic support for supporting a mechanism such as an information pick-up device for picking up information. Examples of the elastic support are an oil damper, elastic damper, and spring. Generally, each of the mechanical dampers is improved so that it has a certain natural frequency capable of effectively reducing vibrations and shocks which would otherwise provide an adverse effect to an internal mechanism of the unit.

For example, JP (A) 3-234940 discloses an oil damper having a cylindrical member or housing made of rubber in which silicone oil with high viscosity is encapsulated. The oil damper is formed at its center with a bearing recess for supporting a shaft of a disk bearing mechanism and a plurality of resisting portions extending outwardly from the bearing recess. With this oil damper, vibrations and shocks are reduced significantly by elastic deformations of the resisting portions as well as by the viscous silicone oil. The cylindrical member, however, since it encapsulates the silicone oil and carries the bearing recess and resisting portions, is considerably complicated in structure. Also, the cylindrical member needs another member such as a support flange made of material different from the cylindrical member for holding the oil damper in a stable position. Further, since the major part of the damper is made of elastic material which is easily deformed by an external force, another supporting member such as a spring is required for positively supporting the disk drive unit. Furthermore, the oil damper allows the shaft to move in a wide range, which requires an extended space to prevent mechanical collisions in the disk drive unit. Moreover, it is difficult to make one natural frequency in one direction so different from that in another direction.

JP (A) 1-92984 discloses another disk drive unit in which a frame carries an optical card which moves in one direction on the frame. An optical head is supported on the card so that it moves in another direction perpendicular to the one direction. The frame is supported through vibration-proof members on a housing of the device. The vibration-proof member, made of elastic material such as rubber and formed with a horizontal through-hole, is characterized in that a flexibility in the first direction along which the optical head moves is greater than that in the second direction perpendicular to a major surface of the optical card, and the flexibility in the second direction is greater than that in the third direction along which the optical card moves.

With this disk drive unit, when trying to provide respective natural frequencies for the first to third directions, respectively, the natural frequency of the optical head becomes closer to those of the vibration-proof member. This would cause a resonance between the vibration-proof member and the optical head to eventually increase the reading defects. Also, since the vibration-proof member is secured by the use of screws, it should be formed with two portions, rigid portions suitable for screw mounting and flexible portions suitable for reducing the transmitted vibrations and shocks, which makes the replay device costly. Further, the card-like information bearing member is moved linearly, which requires a larger space than the replay device using disks.

JP(A) 2-61881 discloses another disk drive unit in which an optical pick-up device is mounted so that it moves in a radial direction of a disk. The pick-up device is supported on a disk drive mechanism mounted through a vibration-proof member on a cabinet. The vibration-proof member, which is made of elastic material such as rubber and in the form of a cylinder having an elliptical cross section, is arranged so that its longitudinal axis is oriented perpendicular to a major surface of the disk. In addition, the vibration-proof member is designed so that its elasticity in a direction along which the pick-up device moves (i.e., first direction) is less than those in second and third directions perpendicular to each other and to the first direction. However, the vibration-proof member can resonate with the optical head. Also, the vibration-proof member is fixed to the cabinet and disk drive mechanism with its outer grooves in engagement with holes provided in the cabinet and disk drive mechanism. This makes assembly of the vibration-proof members complicated. In addition, the vibration-proof members can be moved out of corresponding holes when subject to a drop shock, which may damage mechanisms in the disk drive unit. To prevent this, another damper should be provided, which increases the size of the disk drive unit and the number of parts, making the disk drive unit costly.

As described above, expected is a small, inexpensive, and simple damper with suitable damping features and which is not deformed excessively, and which does not require a fixing member or additional spring member.

Also expected is a damper which can be easily designed so that its natural frequencies in different directions can be increased or decreased relative to those of the optical head.

SUMMARY OF THE INVENTION

Accordingly, an object of the present invention is to provide an improved disk drive apparatus suitable for use in an automobile. Another object of the present invention is to provide an improved disk drive apparatus capable of preventing vibrations and shocks from being transmitted to an optical head of the disk drive apparatus and thereby preventing possible read defects by the optical head. Another object of the present invention is to provide a disk drive apparatus having elastic dampers capable of being assembled in the apparatus without any difficulty and damping vibrations and shocks transmitted to the optical head. Still another object of the present invention is to provide a damper having a simple structure, which can be assembled with ease, and which reduces vibrations and shocks effectively.

For these objects, a disk drive apparatus of the present invention includes a fixed frame and a movable frame movably supported on the fixed frame for supporting a disk to be replayed. The movable frame has a turntable for rotatably supporting the disk, an optical head for optically reading information recorded in one surface of the disk supported on the turntable, and a guide for moving the optical head in a radial direction of the supported disk. The apparatus further includes one or more supports for movably supporting the movable frame on the fixed frame. Each support has a damper made of elastic material and is designed to have a specific damping feature. Specifically, the damper has a first natural frequency that is less than that of the optical head with respect to a first direction along which the optical head moves back and forth. Also, the damper has a second natural frequency that is greater than that of the optical head with respect to a second direction perpendicular to the surface of the disk. Further, the damper has a third natural frequency that is greater than that of the optical head with respect to a third direction perpendicular to the first direction and parallel to the surface of the disk.

In another aspect of the present invention, the support also has a shaft mounted in the movable frame and extending from the movable frame in the first direction, and a bearing portion formed in the fixed frame for bearing the shaft through the damper. Also, the damper has an inner ring portion in which the shaft of the movable frame is inserted and held, an outer ring portion held by the bearing portion of the fixed frame, and a plurality of radial ribs extending radially from the inner to outer, ring portions for connecting between the inner and outer ring portions.

In another aspect of the disk drive apparatus according to the present invention, the plural radial ribs include two ribs arranged on opposite sides of the inner ring portion and extending in the second direction and another two ribs arranged on opposite side of the inner ring portion and extending in the third direction.

In another aspect of the disk drive apparatus according to the present invention, the plural radial ribs include four ribs arranged substantially at regular angles and extending obliquely to the second direction.

In another aspect of the disk drive apparatus according to the present invention, each of the ribs has substantially a rounded cross section.

In another aspect of the disk drive apparatus according to the present invention, the damper further includes webs, each extending between inner and outer ring portions and also neighboring radial ribs. Preferably, each web has a thickness in the first direction smaller than that of the ribs.

In another aspect of the disk drive apparatus according to the present invention, a restriction is provided to prevent deformation of the damper within a certain distance with respect to the second direction.

An elastic damper according to the present invention is preferably used in a disk drive apparatus including a fixed frame and a movable frame, so that the movable frame is movably supported on the fixed frame through the dampers. Each damper has an inner ring portion that is supported by a shaft equipped in one of the fixed or movable frame. An outer ring portion is arranged substantially coaxially with the inner ring portion. The outer ring portion is supported by a bearing portion equipped in the other of the fixed or movable frame. A plurality of ribs are extended radially from the inner to outer ring portions for connecting between the inner and outer ring portions.

In another aspect of the damper according to the present invention the damper further includes webs, each of which is extended and connecting between the inner and outer ring portions, and the neighboring ribs.

In another aspect of the damper according to the present invention, the fixed frame has first and second frame portions which are assembled with each other during mounting of the movable frame to the fixed frame. The outer ring portion is formed with a first engagement portion with which the first frame portion is engaged and a second engagement portion with which the second frame portion is engaged, for positively supporting the movable frame on the fixed frame.

According to the disk drive apparatus with dampers, as the natural frequencies with respect to the first to third directions differ from those of the optical head, vibrations and shocks transmitted from the fixed frame to the movable frame and to the optical head can effectively be reduced, which ensures that the optical head reads information recorded in the major surface of the disk.

Also, provided is a damper that is small and capable of effectively reducing vibrations and shocks with its small deformation. The damper is provided with a suitable feature for reducing vibrations and shocks simply by changing the thickness of the ribs and webs. Further, the damper can support the movable frame without any aid of additional support members such as a spring. Furthermore, the damper has a creep-resist feature that resists creep due to a constant load.

Besides, for shocks and vibrations, in particular having higher frequencies, exerted during driving on bumpy roads and bumps, the optical head as well as the movable frame is returned to its neutral position as quickly as possible, which prevents replay interruption with an aid of the signal processing approach. Also, the damper is designed to have a suitable rigidity that prevents the movable frame as well as the optical head from colliding with neighboring mechanisms.

Also, the damper having ribs extending obliquely with respect to the second direction has an increased durability, which ensures suitable reduction of vibrations and shocks for a long time. In this embodiment, the orientations of the ribs may be changed depending upon the vibration and shock reduction features required for the damper.

Further, the damper having portions for engagements with the fixed and movable frames can be easily assembled in the disk drive unit and is positively held by the fixed and movable frames even when it is subject to considerable vibrations and shocks.

BRIEF DESCRIPTION OF THE DRAWINGS

FIG. 19 is a side elevational view of the disk drive unit of a second embodiment in which the damper has four obliquely extended ribs;

DETAILED DESCRIPTION OF THE PREFERRED EMBODIMENTS

Figure 1:
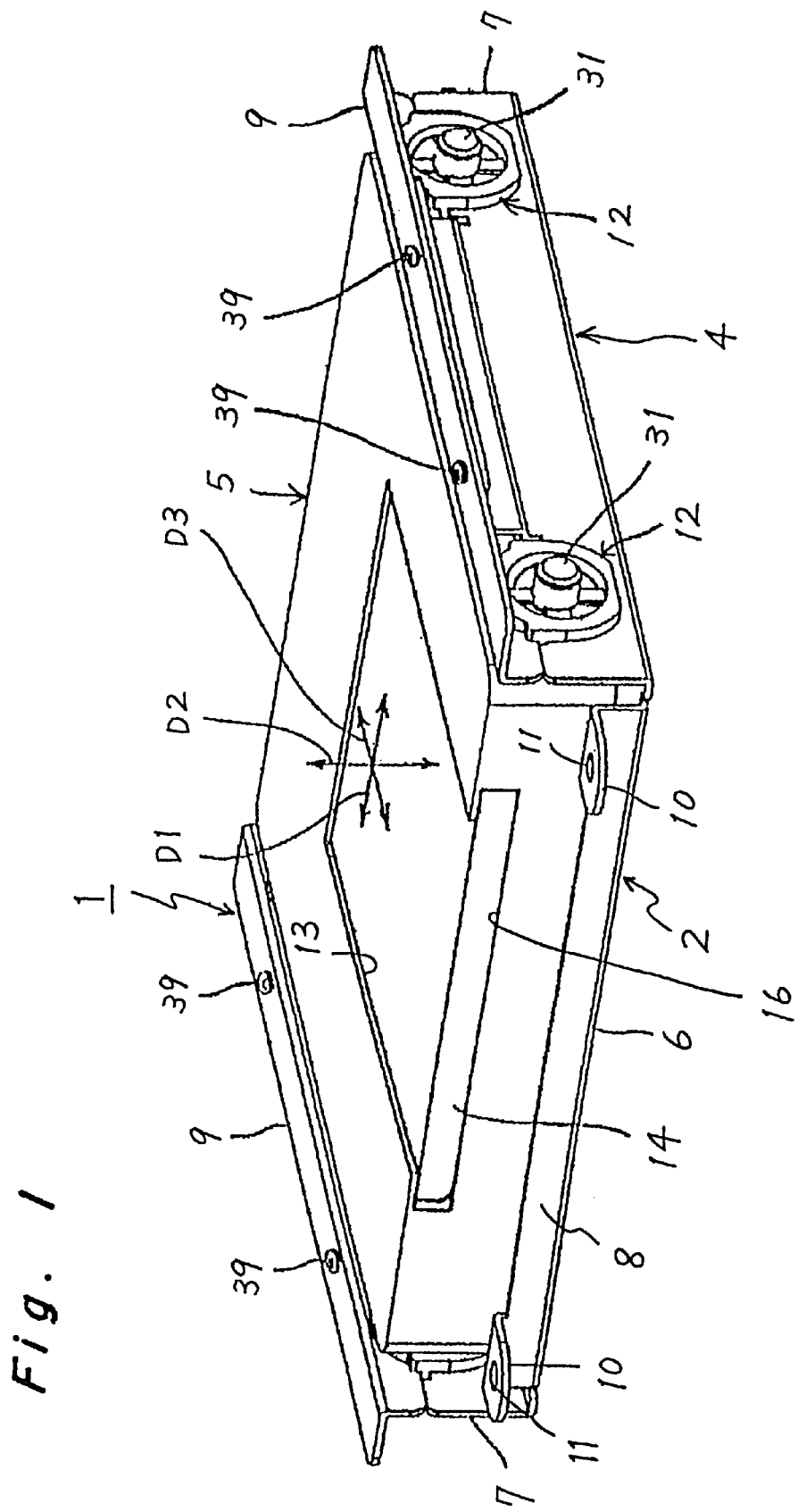
FIG. 1 is a perspective view of a disk drive unit of the present invention.

With reference to the drawings, particularly in FIGS. 1 to 5, a disk drive unit for replaying information recorded in a major surface of a disk or optical disk will be described hereinafter. The disk drive unit, preferably mounted in an automobile and generally indicated by reference numeral 1, includes a boxlike housing generally indicated by reference numeral 2, preferably made of metal. As best shown in FIG. 1, the housing 2 includes a fixed frame 4 to be fixed to the automobile and a movable frame 5 movably supported on the fixed frame 4. The fixed frame 4 has a rectangular lower plate 6 extending horizontally, a pair of lower side wall portions 7 each extending vertically and upwardly from opposite side ends of the lower plate 6, and a pair of front and rear walls (only front wall is indicated in the drawings by reference numeral 8) each extending vertically and upwardly from front and rear ends of the lower plate 6. Each of the lower side wall portions 7 carries an upper side wall portion 9 that cooperates with the associated lower side wall portion 7, for supporting the movable frame 5. Each of the front and rear walls carries a pair of flanges 10 each formed with a hole 11 for fixing the frame 4 to the automobile.

The movable frame 5, which is sized and configured to be positioned between the opposing side wall portions 7 of the fixed frame 4, is supported by a set of damping mechanisms generally indicated by reference numeral 12 described in detail hereinafter. Also, the movable frame 5 defines a square chamber 13, adjacent to the front wall 8 of the fixed frame 4, into which a cartridge 14 including an information bearing disk 15 or optical disk (see FIG. 2) is inserted through a front opening 16 defined in the movable frame 5.

Figure 2:
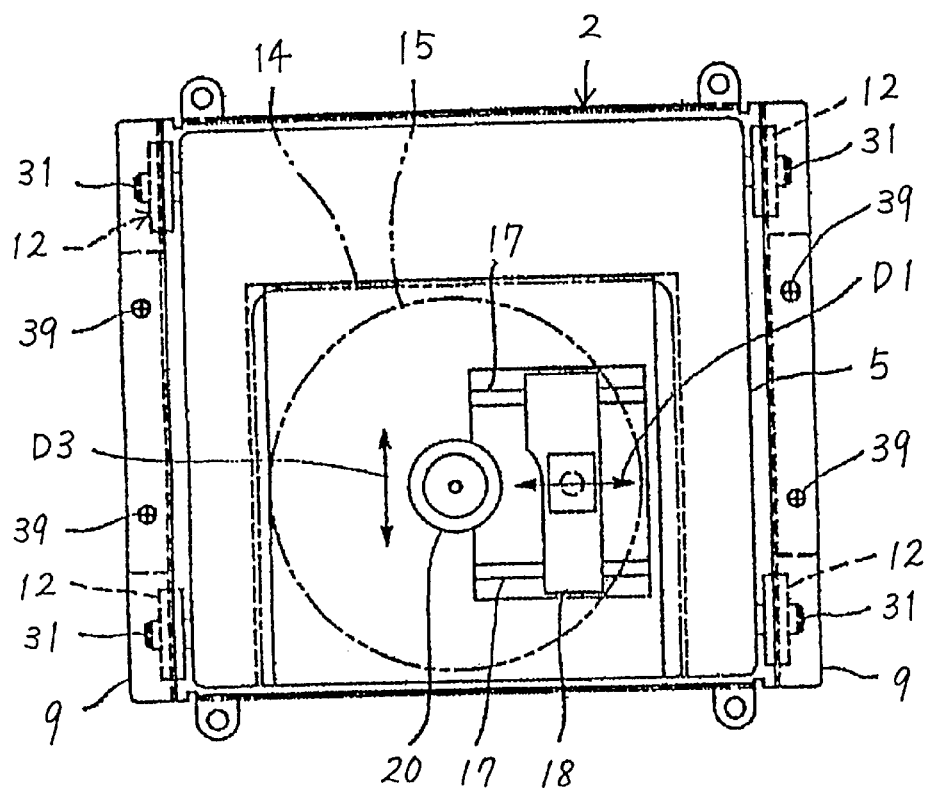
FIG. 2 is a top plan view of the disk drive unit shown in FIG. 1.
Figure 3:
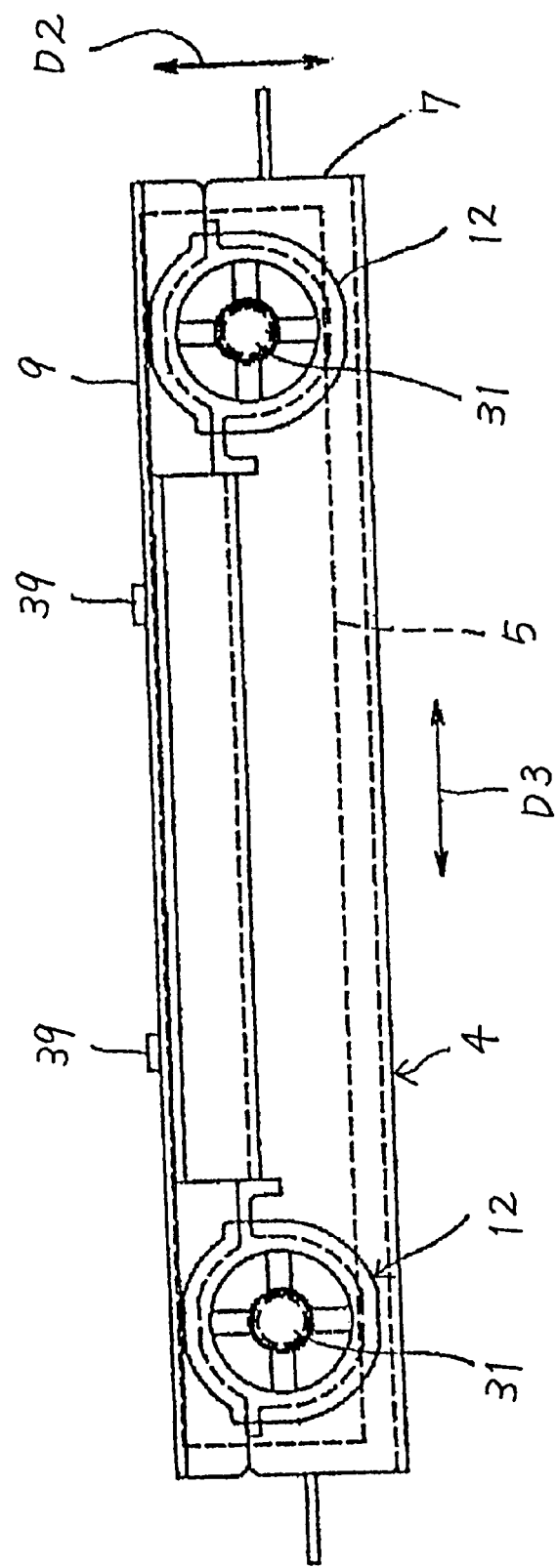
FIG. 3 is a side elevational view of the disk drive unit shown in FIG. 1.
Figure 4:
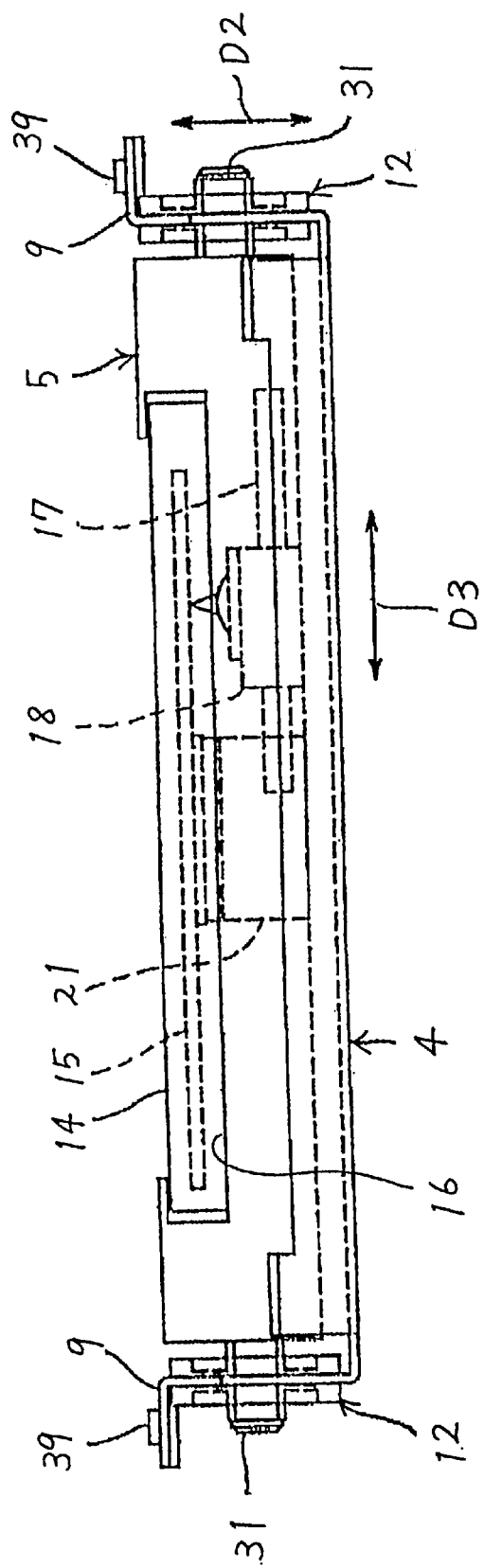
FIG. 4 is a front elevational view of the disk drive unit shown in FIG. 1.

As best shown in FIG. 2, underneath the chamber 13, there is provided a pair of guides or screw rods 17 extending horizontally and parallel to a radial direction of the inserted disk 15. The screw rods 17 support an optical head 18 capable of optically reading information recorded in a bottom surface of the disk 15. To move the optical head 18 back and forth across the disk 15, the pair of screw rods 17 are drivingly connected to a drive mechanism having a feed motor 19 (see FIG. 5). In addition, the movable frame 5 supports a turntable 20 for supporting and chucking the disk 15. The turntable 20 is supported by and drivingly connected to a motor or spindle motor 21 (see FIG. 4) for rotating the disk 15 in the cartridge 14 inserted in the chamber 13.

Figure 5:
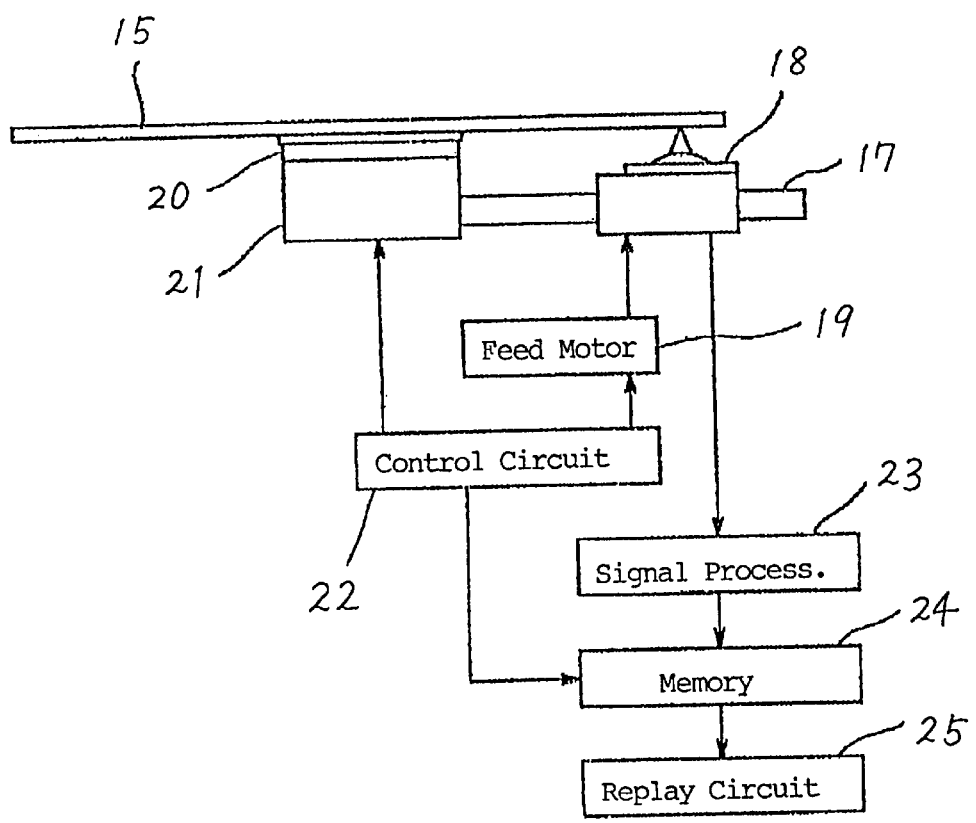
FIG. 5 is a block diagram of the disk drive unit shown in FIG. 1.

In operation of the disk drive unit 1 so constructed, when the cartridge 14 is inserted in the chamber 13, the disk 15 is chucked and held by the turntable 20. Then, as shown in FIG. 5, a control circuit 22 drives both motors 19 and 21, so that the disk 15 is rotated in a predetermined direction and the optical head 18 moves in the radial direction of the disk 15. Also, the optical head 18 reads information recorded in the bottom surface of the disk 15. The read-out information, which is an analogue signal, is transmitted to a signal processing unit 23 where it is modulated into a digital signal. The digitized information is then stored in a memory 24 that is subsequently read out by a command from the control circuit 22 for replay. The read-out digital information is then modulated into the analogue form again, which is utilized at a replay circuit 25 for replaying the information.

In this replay process, vibrations and shocks mostly transmitted from a body of the automobile provide adverse effects, i.e., read defects, in the reading process of information from the disk by the optical head 20. To prevent an interruption in the replay operation, the control circuit 22 is designed so that it conducts an error check for each record block of the disk immediately after the information reading of the record block and, if a read error occurred, it instructs the optical head 18 to read again the same record block during which information stored in the memory 24 is fed to the replay circuit 25 where it is played.

Although the conventional disk drive unit 1 is designed to prevent the replay interruption by such signal processing approach as described above, it should further be improved to minimize the vibrations and shocks to be transmitted to the optical head 18. To this end, the damping mechanism 12 is provided for each of plural connecting portions between the fixed and movable frames, 4 and 5.

Figure 6:
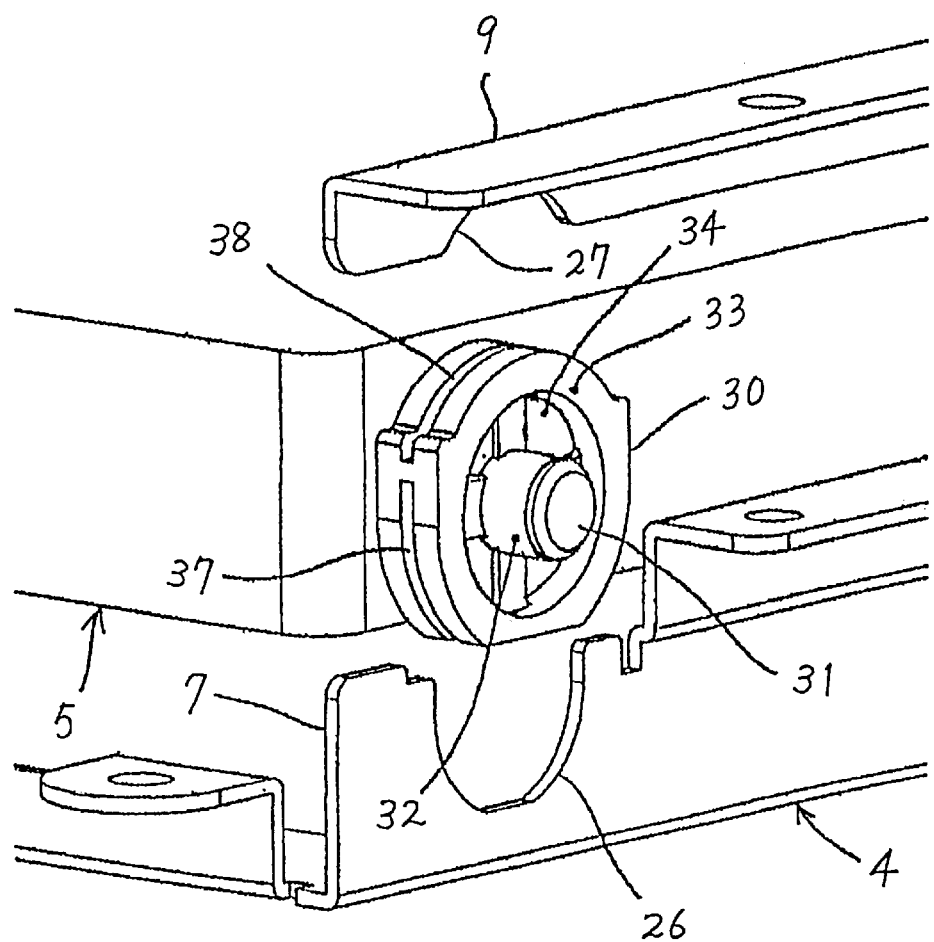
FIG. 6 is an enlarged and exploded perspective view of the disk drive unit showing a damper for supporting a movable frame on a fixed frame.
Figure 7:
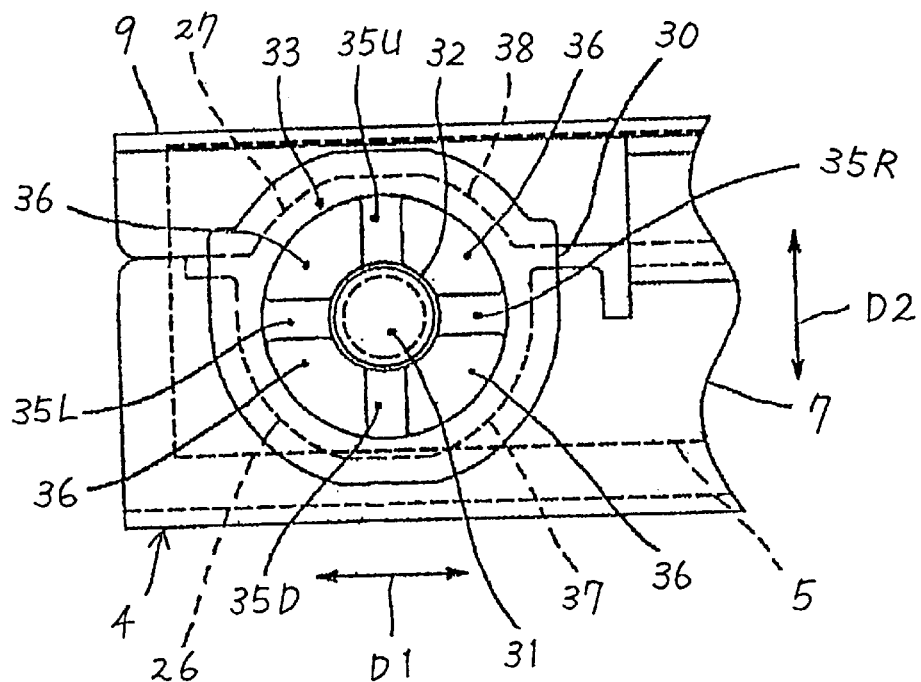
FIG. 7 is an enlarged partial side elevational view of the disk drive unit showing details of the damper.
Figure 8:
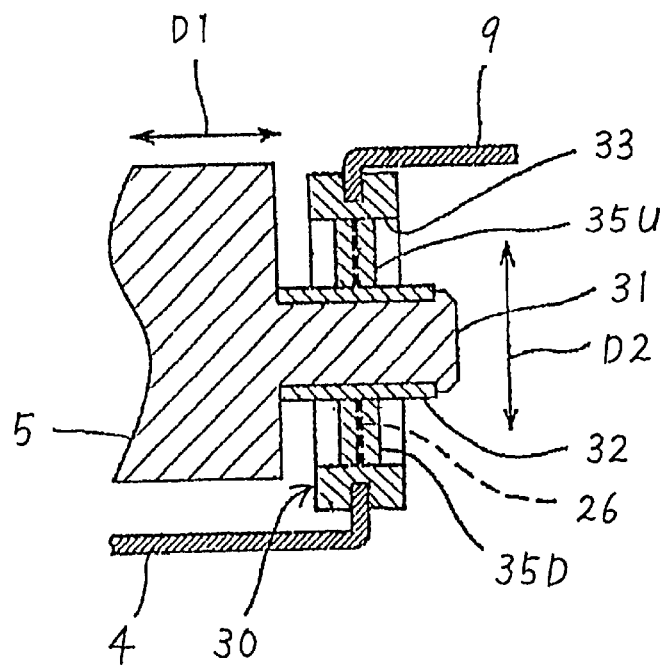
FIG. 8 is an enlarged cross sectional view of the disk drive unit showing the details of the damper.

As best shown in FIGS. 6, 7, and 8, for each damping mechanism 12, each lower side wall portion 7 of the fixed frame 4 is formed at its front and rear side with a respective U-shaped cutout 26, extending downwardly from its top edge. On the other hand, the associated upper side wall portion 9 is formed at its front and rear portions with arch-like cutouts 27 each extending upwardly from its bottom edge so that, when upper side wall portion 9 is assembled on the lower side wall portion 7 as shown in FIG. 1, the lower and upper cutouts, 26 and 27, face each other and hold a damper 30 between them.

The damper 30 is provided for each of four shafts 31, provided at front and rear portions of opposite side walls of the movable frame 5, opposing the lower and upper side wall portions, 7 and 9, of the fixed frame 4 and projected outwardly from the side walls in a first direction indicated by arrow D1. Preferably, the damper 30 is made of elastic material such as rubber capable of absorbing and then damping a considerable part of the vibrations and shocks to be transmitted from the fixed frame 4 to the movable frame 5 and then to the optical head 18.

The damper 30 has an inner ring portion 32, an outer ring portion 33 coaxially arranged with the inner ring portion 32, and an intermediate portion 34 connecting the inner and outer ring portions, integrally formed by a well known molding technique. The inner ring portion 32 in the form of a cylinder has an inner diameter substantially identical to an outer diameter of the shaft 31 so that the damper 30 is securely supported through the inner ring portion 32 on the shaft 31. Further, the intermediate portion 34 of the damper 30 has four equally spaced ribs 35 extending radially from the inner ring portion 32 to the outer ring portion 33. In this embodiment, provided are four radial ribs; i.e., two ribs 35U and 35D extending vertically (i.e., in a second direction indicated by arrow D2) and two ribs 35L and 35R extending horizontally (i.e., in a third direction indicated by arrow D3), each connecting between the inner and outer ring portions, 32 and 33. In this embodiment, the rib 35 has a rectangular cross-section; however, it may have another configuration such as round. The intermediate portion 34 further includes webs 36, each having a thickness less than that of the rib 34 and provided between the inner and outer ring portions, 32 and 33, and neighboring ribs.

It should be noted that the first direction D1 is a direction along which the optical head 18 travels, the second direction D2 is a direction perpendicular to the major surface of the disk 15, and the third direction D3 is a direction perpendicular to the first direction D1 and parallel to the major surface of the disk.

In addition, as best shown in FIG. 6, the outer ring portion 33 is formed with a lower groove 37 in its lower outer peripheral surface portion confronting the lower cutout 26 and with an upper groove 38 in its upper outer peripheral surface portion confronting the upper cutout 27 in the upper side wall portion 9.

The damper 30 so configured is secured in the opposing lower and upper cutouts, 26 and 27, so that its lower and upper grooves 37 and 38 hold respective portions of the lower and upper side wall portions defining the lower and upper cutouts, 26 and 27, respectively. The damper 30 is finally fixed immovably by connecting the lower and upper side wall portions, 7 and 9, with suitable connecting members such as screws 39.

This ensures that the damper 30 is securely connected so that a required damping effect is obtained and positively held without the damper moving out of the cutouts, 26 and 27. Also, in assembly, the dampers 30 are simply placed on the corresponding lower cutouts 26 and then the upper side wall portions 9 are mounted on the dampers. This means that the assembling of the lower and upper side wall portions, 7 and 9, and dampers 30 can be done from one direction, e.g., from above. This eases the assembling of such parts with a reduced number of assembly steps.

Figure 12:
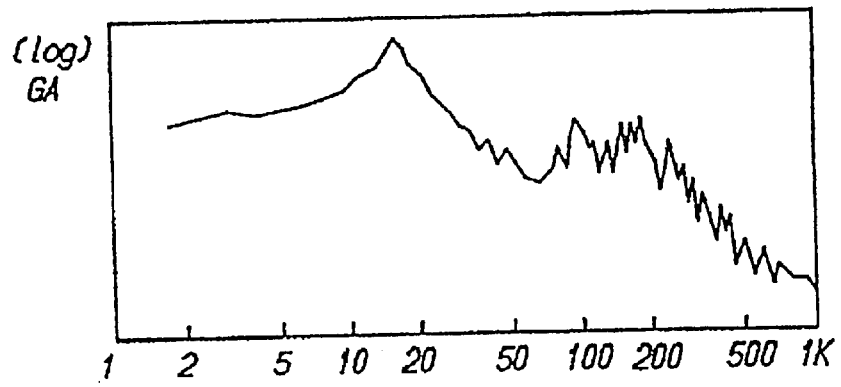
FIG. 12 is a graph showing a frequency versus intensity characteristic of vibrations generated during driving of an automobile.

FIG. 12 graphs a frequency versus acceleration of vibrations generated during test driving of an automobile. This shows that the disk drive unit 1 is subject to greater vibrations ranging at about 10 Hz and about 70–200 Hz.

Figure 9:
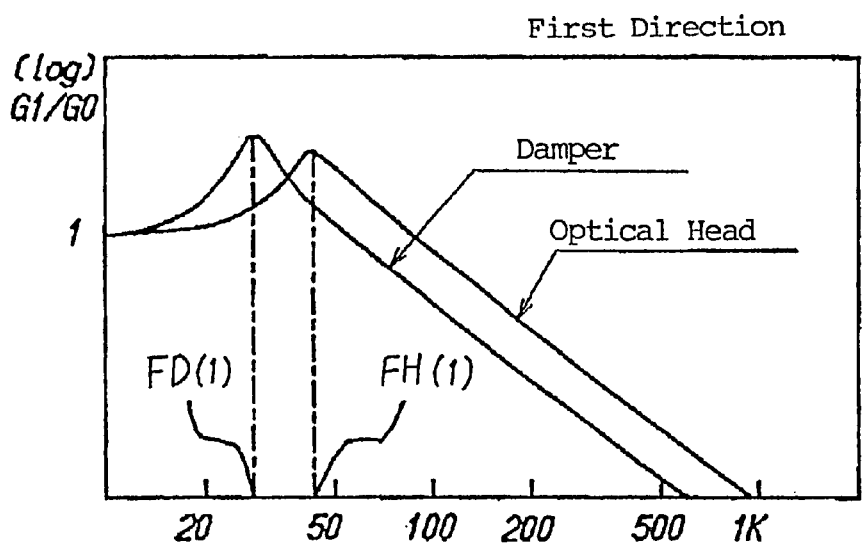
FIG. 9 is a graph showing a frequency versus output/input ratio characteristic of the damper and an optical head with respect to a first direction.
Figure 10:
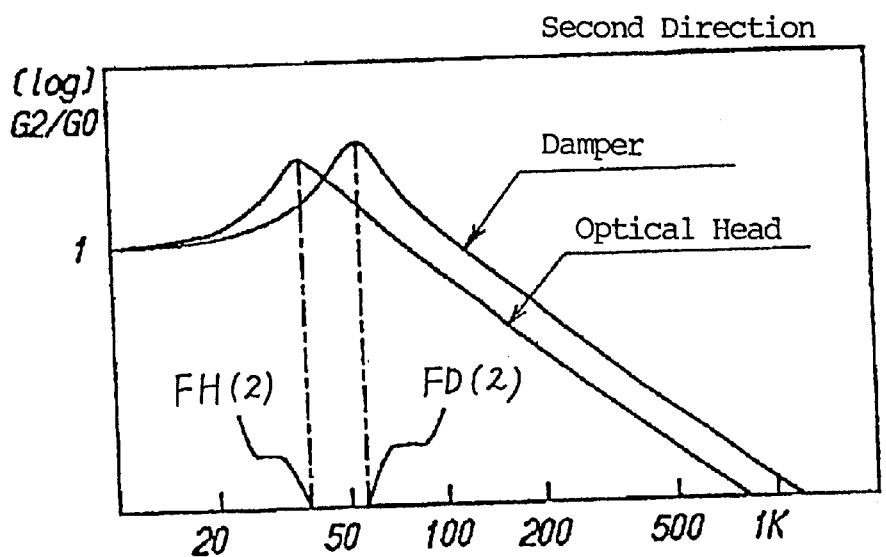
FIG. 10 is a graph showing a frequency versus output/input ratio characteristic of the damper and the optical head with respect to a second direction.
Figure 11:
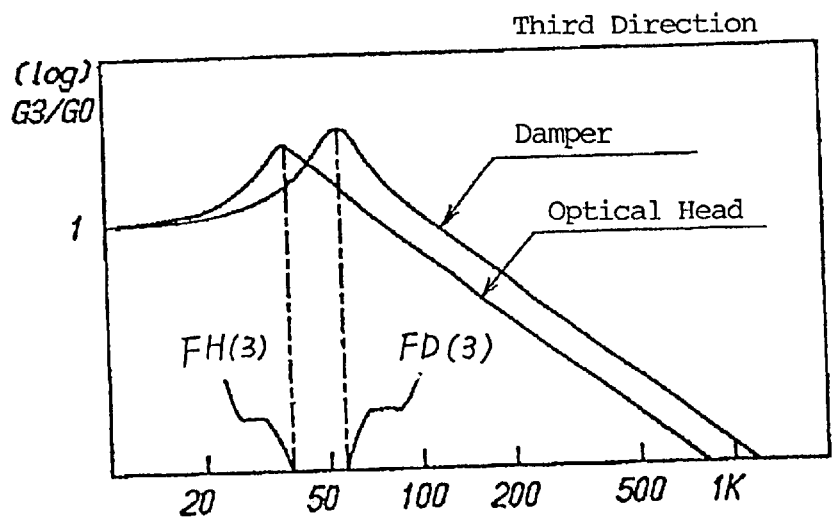
FIG. 11 is a graph showing a frequency versus output/input ratio characteristic of the damper and the optical head with respect to a third direction.

Also, FIGS. 9 to 11 show frequency versus reduction ratio (i.e., output/input ratio) characteristics of the damper and the optical head with respect to first, second, and third directions, respectively. As can be seen from these graphs, the damper 30 is designed so that, with respect to first to third directions, it has respective natural frequencies of less than about 60 Hz which is less than the frequency range of 70–200 Hz which mainly occurs during driving of the automobile. This prevents the damper from resonating with the vibrations ranging 70–200 Hz with respect to first to third directions. Besides, this allows the damper 30 to effectively reduce vibrations from 70 to 200 Hz.

As described above, since the first direction is the tracking direction along which the optical disk moves back and forth for reading information recorded in the surface of the disk, the vibrations and shock acting in this direction have greater effects with respect to the read defects. Since the second direction is the gravitational direction, vibrations and shocks during driving in this direction are considerably increased. The third direction is the time base direction along which the disk is inserted and, at insertion of the disk, a greater force is applied in this direction. Also, vibrations and shocks acting in the second and third directions have less effects with respect to the read defects than those in the first direction.

Under these considerations, as best shown in FIG. 9, with respect to the first direction, the damper 30 is designed so that its natural frequency FD(1) is less than the natural frequency FH(1) of the optical head 18. This allows the damper 30 to effectively reduce a major part of the vibrations, in particular vibrations of about 70 to 200 Hz which occur during the driving of automobiles, effectively preventing the read defects from occurring.

Next, as shown in FIG. 8, with respect to the second direction, the damper 30 is designed so that its natural frequency FD(2) is greater than the natural frequency FH(2) of the optical head 18. This means that the read defects due to vibrations of lower frequencies are compensated by the signal processing approach as described above. During this compensation, the elastic damper 30 causes the movable frame 5 and optical head 18 to return their home positions to where the optical head would retry to read information recorded in the same record block of the disk, which ensures prevention of replay interruption. In addition, the increased natural frequency FD(2) as well as its increased rigidity thereby ensures that the damper 30 can bear a greater load, allowing the damper 30 to return the movable frame as well as optical head in respective places quickly and to have a greater durability for creep. This in turn allows the damper 30, by itself, to support the movable frame 5 positively without an additional spring or other support means.

Likewise, as shown in FIG. 10, with respect to the third direction, the damper 30 is designed so that its natural frequency FD(3) is greater than the natural frequency FH(3) of the optical head 18. This may result in the read defects due to vibrations of lower frequencies; however, such defects can be compensated for by the signal processing approach as described above. During this compensation, the optical head is returned quickly to the reading position where the optical head would retry to read information recorded in the disk, which ensures prevention of replay interruption. In addition, the increased natural frequency FD(3) ensures that the damper 30 bears a greater load, allowing the damper to return the movable frame as well as optical head in respective places so quickly and to have a greater durability for creep. Besides, when the cartridge 14 is inserted into and removed from the movable frame 5, the movable frame 5 is retained in a stable state without being moved in a wide range. This in turn allows the damper 30, by itself, to support the movable frame 4 positively without using an additional spring or other support means. Also, no locking mechanism is needed for locking the movable frame at the insertion and removal of the cartridge 14 to prevent excessive displacements of the movable frame.

As can be seen from above, since the natural frequencies of the damper 30 with respect to first to third directions are shifted away from the natural frequency of the optical head 18, the optical head 18 does not vibrate so vigorously in response to the vibrations and shocks transmitted from the fixed frame. This considerably reduces the read defects, which would otherwise be caused by the vibrations and shocks transmitted from the fixed frame. Also, by the use of elastic material with a higher damping characteristic, the resonance rate of the damper can further be reduced.

The natural frequency of the damper 30 in each of the first to third directions can be adjusted simply by changing the sizes or dimensions of the ribs and webs. For example, the natural frequency FD(1) and/or FD(2) with respect to the first and/or second direction can be increased by increasing the width of the ribs with respect to the peripheral direction of the damper 30. The natural frequency FD(1) and/or FD(2) with respect to the first and/or second direction can also be decreased simply by decreasing the width of the ribs 35. It should be noted that the natural frequency of the damper 30 in each direction can also be adjusted by changing the thickness of either or both of the ribs 35 and webs 36.

Figure 13:
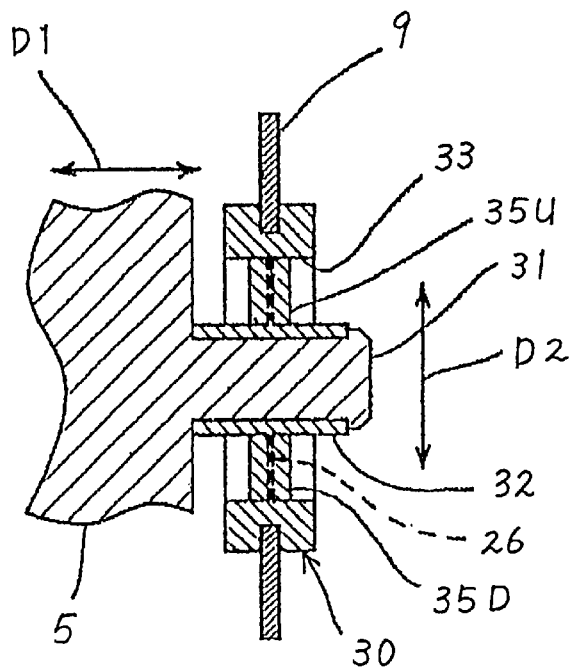
FIG. 13 is a partial cross sectional view of the disk drive unit showing the damper in its original shape.
Figure 14:
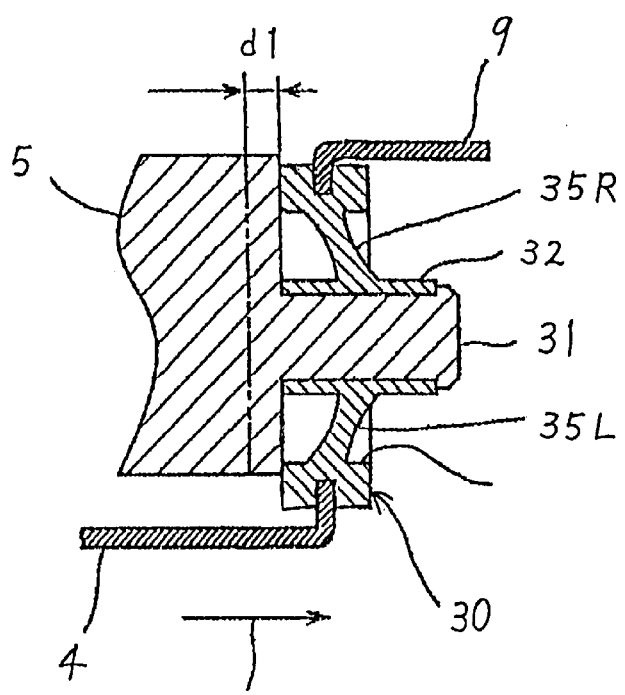
FIG. 14 is a partial cross sectional view of the disk drive unit showing a deformation of the damper when it suffers from vibrations and shocks with respect to the first direction.

Deformations of the damper 30 will further be described hereinafter. As best shown in FIGS. 13 and 14, when the disk drive unit 1 is subject to vibrations and shocks with respect to the first direction D1, the movable frame 5 with the shaft 31 moves back and forth in that direction. This causes the ribs 35 and webs 36 to follow the shaft 31 in deforming in the first direction, which reduces the vibrations and shocks to be transmitted from the fixed frame 4 to the movable frame 5 and then to the optical head 18. The maximum displacement of the shaft 31 is indicated at d1 in FIG. 13. When the disk drive unit 1 suffers from greater vibrations and shocks which would cause the shaft 31 to displace more than the maximum displacement d1, the movable frame 5 makes a contact with the side surface of the outer ring portion 33 to force it slightly. This prevents not only excessive deformations of the vertical and horizontal ribs 35 but also the fatigue failure thereof.

Figure 15:
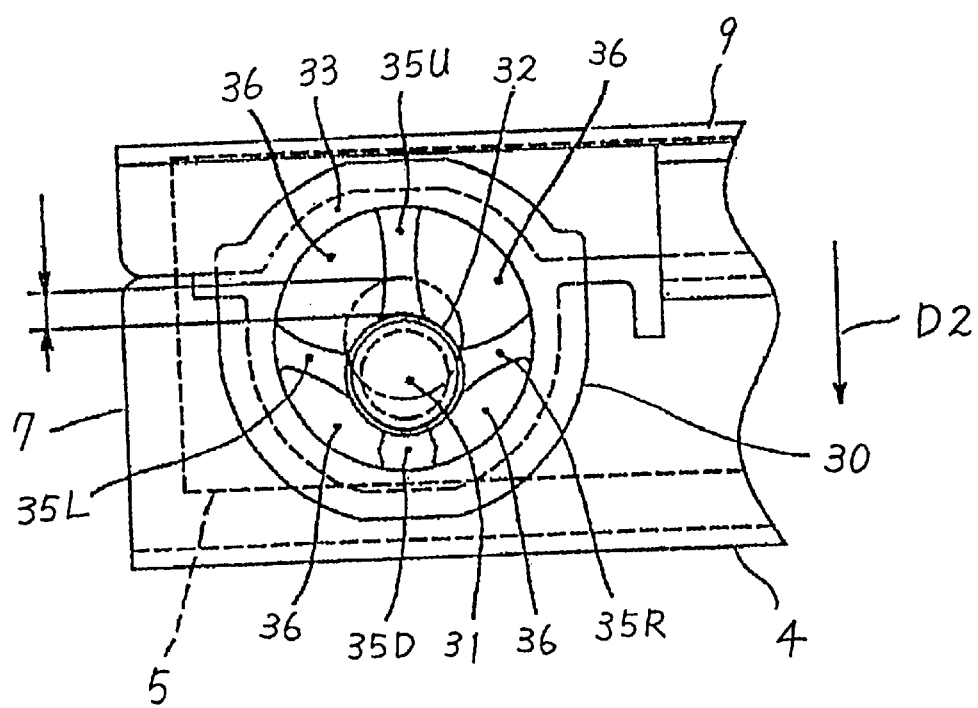
FIG. 15 is a partial side elevational view of the disk drive unit showing the deformation of the damper when it suffers from vibrations and shocks with respect to the second direction.
Figure 16A:
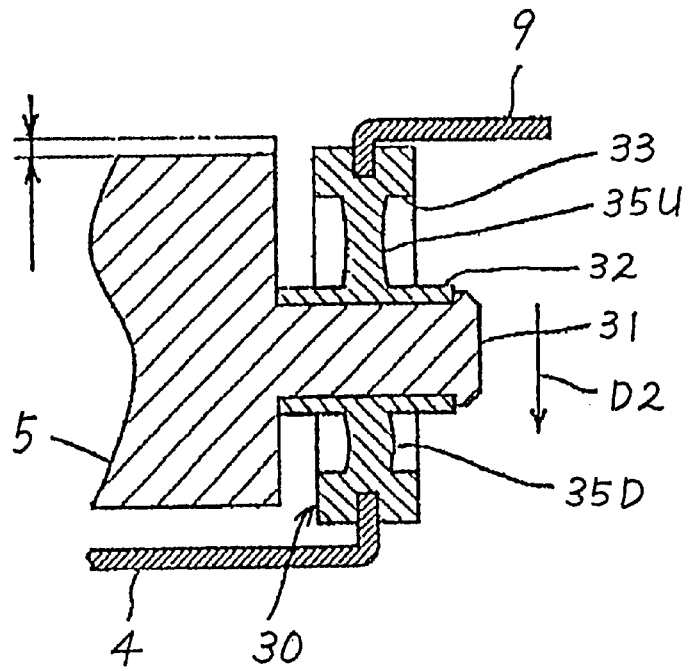
FIG. 16A is a partial cross sectional view of the disk drive unit showing a deformation of the damper when it suffers from small vibrations and shocks with respect to the second direction.
Figure 16B:
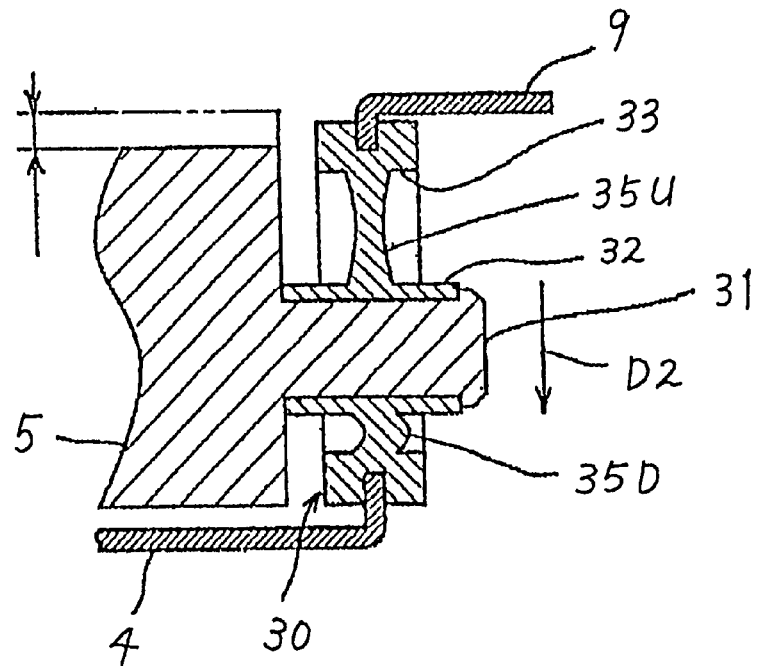
FIG. 16B is a partial cross sectional view of the disk drive unit showing a deformation of the damper when it suffers from big vibrations and shocks with respect to the second direction.

As shown in FIGS. 15, 16A and 16B, when the disk drive unit 1 suffers from vibrations and shocks with respect to the second direction D2, the movable frame 5 moves up and down relative to the fixed frame 4. This causes the horizontal ribs 35L and 35R both to be stretched repeatedly and the vertical ribs 35U and 35D to be compressed and stretched alternatively.

It should be noted that, as shown in FIG. 16A, smaller amplitude vibrations are damped mainly by the compressive deformations of the ribs 35U and 35D. On the other hand, as the amplitude increases, the ribs bend inwardly or outwardly for damping the vibrations and, then, larger amplitude vibrations are damped mainly by the bendings of the ribs 35U and 35D (see FIG. 16B). For this reason, the damper 30 of the present invention is designed to have a higher natural frequency and an increased elasticity, which allows the damper 30, in particular the ribs, to resist against the vibrations or forces applied thereto. Therefore, when driving on bumpy roads, the damper 30 or ribs 35 can resist against considerable shocks without failure. Also, the creep, which would be induced in the damper or ribs by a constant load, can be reduced considerably.

Figure 17:
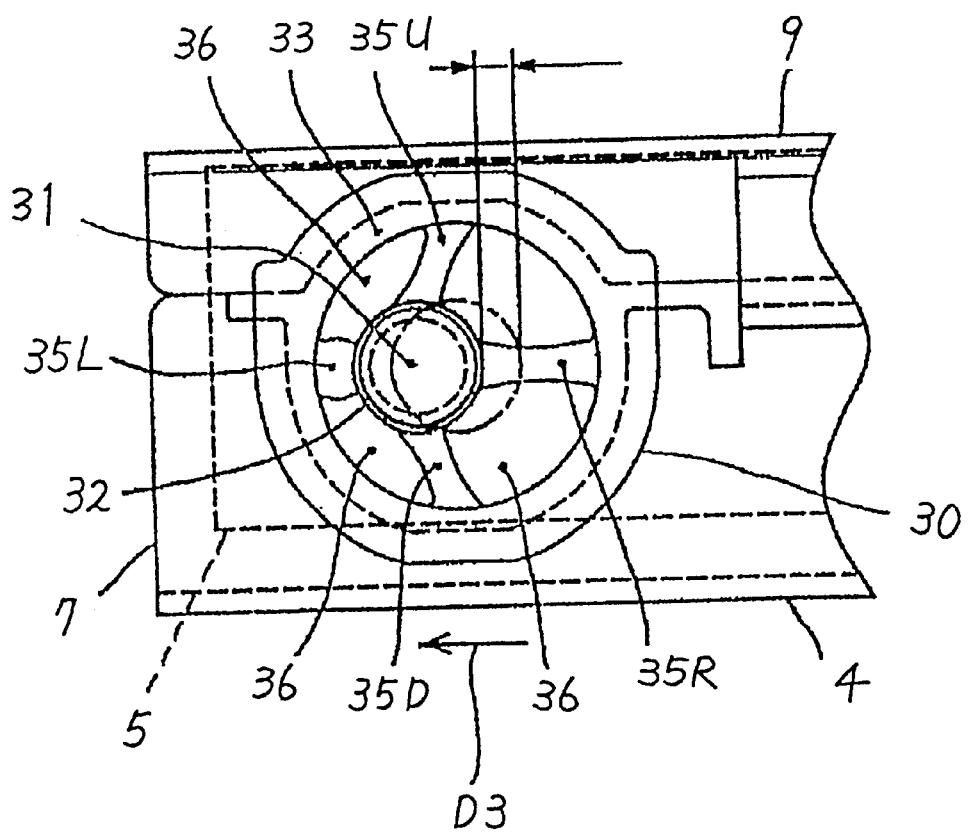
FIG. 17 is a partial side elevational view of the disk drive unit showing the deformation of the damper when it suffers from vibrations and shocks with respect to the third direction.
Figure 18A:
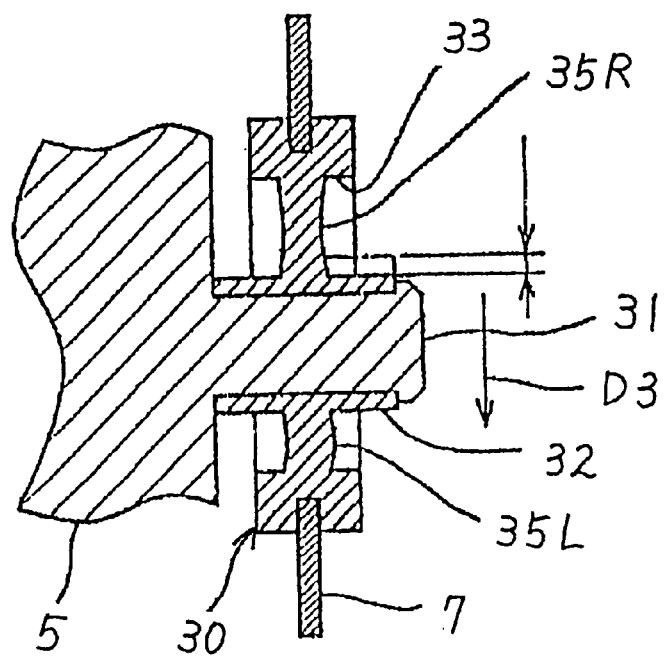
FIG. 18A is a partial cross sectional view of the disk drive unit showing a deformation of the damper when it suffers from small vibrations and shocks with respect to the third direction.
Figure 18B:
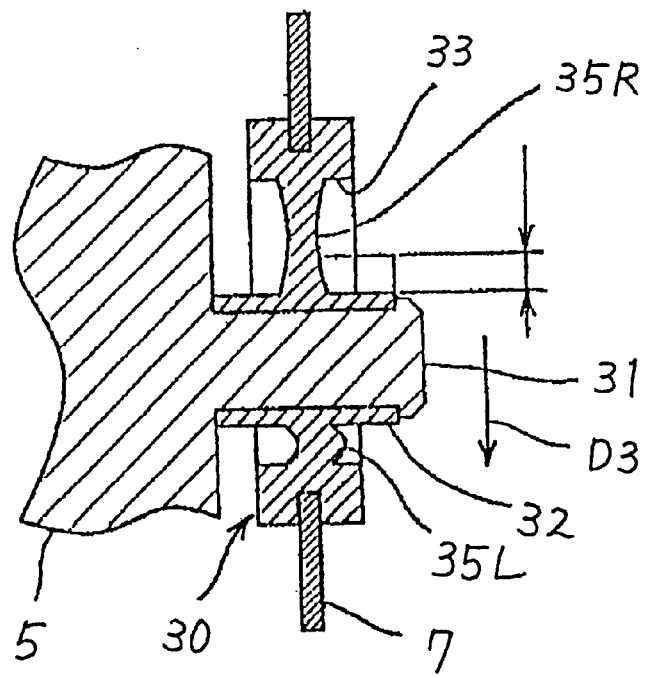
FIG. 18B is a partial cross sectional view of the disk drive unit showing a deformation of the damper when it suffers from big vibrations and shocks with respect to the third direction.
Figure 20:
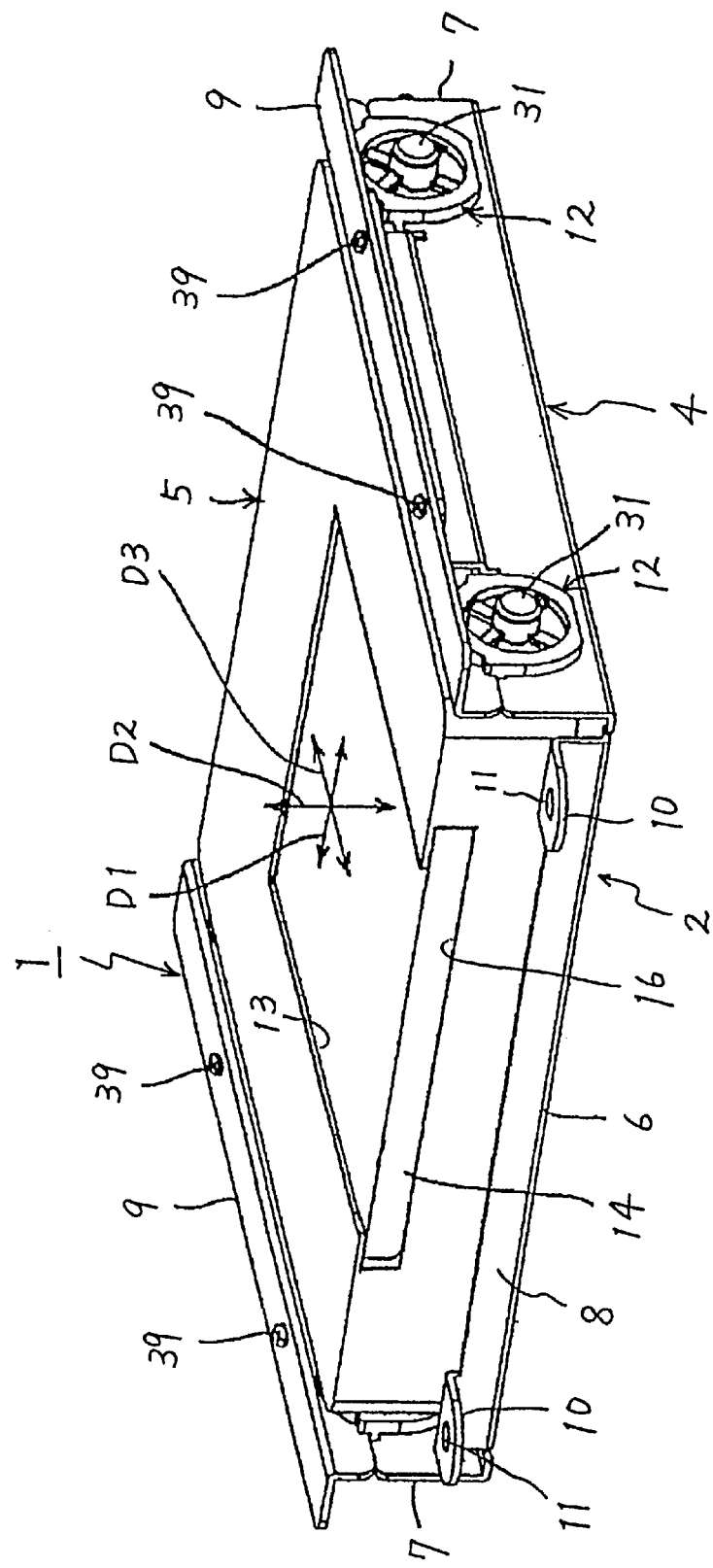
FIG. 20 is a perspective view of the disk drive unit of the second embodiment shown in FIG. 19.
Figure 21:
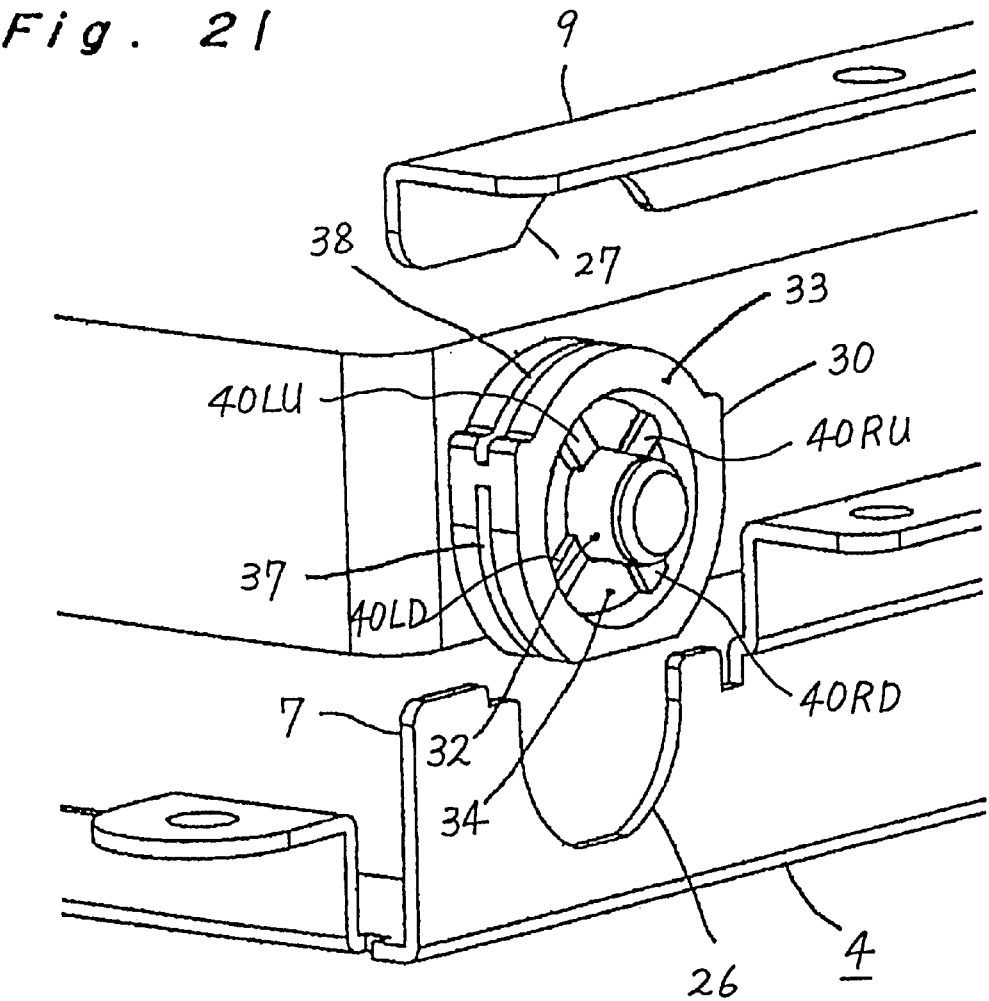
FIG. 21 is an enlarged and exploded partial perspective view of the disk drive unit shown in FIG. 19.

As shown in FIGS. 17, 18A, and 18B, when the disk drive unit 1 suffers from vibrations or shocks with respect to the third direction D3, the movable frame 5 moves from right to left and vice versa relative to the fixed frame 4. This causes the horizontal ribs 35L and 35R to be compressed and stretched alternately and the vertical ribs 35U and 35D both to be stretched repeatedly. Similar to when the damper 30 suffers from the vibrations in the second direction, smaller amplitude vibrations are damped mainly by the compressive deformations of the ribs 35L and 35R. On the other hand, as the amplitude increases, the ribs 35L and 35R bend for damping the vibrations and, therefore, larger amplitude vibrations are damped mainly by the bending of the ribs (see FIG. 12B). For this reason, the damper 30 of the present invention is designed to have a higher natural frequency FD(3) with respect to the third direction D3 and an increased elasticity, which allows the damper 30, in particular ribs 35L and 35R, to resist against the vibrations or forces applied thereto with respect to the third direction. Also, the damper 30 can resist against the force applied at the insertion of the cartridge 10 without any failure thereof.

In view of the above, since the damper 30 is formed with vertically and horizontally rigid ribs, 35U, 35D, 35L and 35R, and thereby is provided with different natural frequencies than that of the optical head 18, it can resist against greater forces applied with respect to the second and third directions. In addition, the rigidities with respect to the second and third directions cause both the shaft and the movable frame supported by the shaft to return to their neutral positions as quickly as possible. This also ensures that, even when the optical head has failed to read information of the disk due to vibrations or shocks, it can retry to read that information again within a considerably short time in which the data stored in the memory would be replayed, which prevents the replay interruption.

Figure 22:
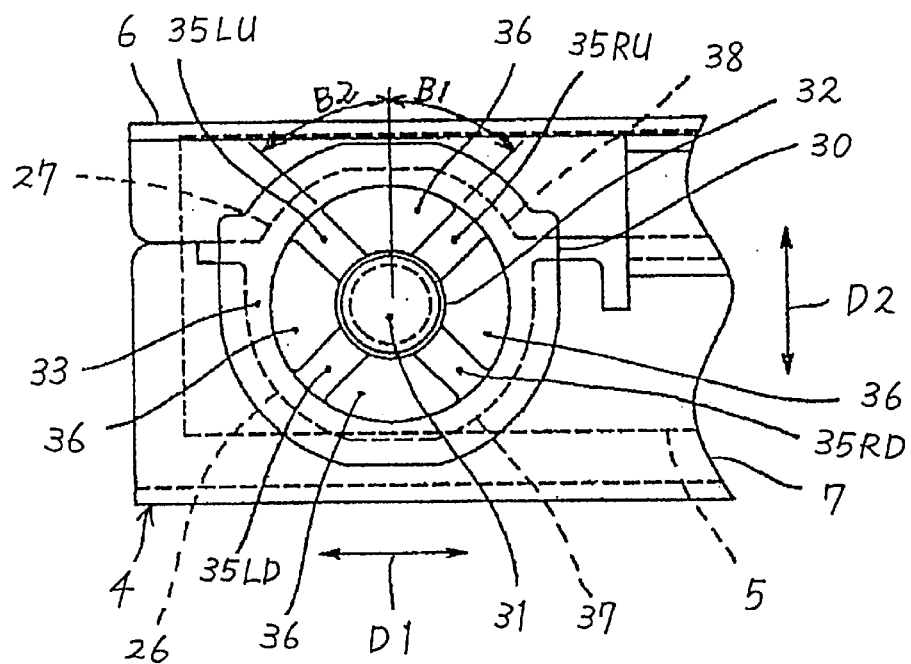
FIG. 22 is an enlarged partial side elevational view of the disk drive unit showing details of a damper of the second embodiment.

FIGS. 19 to 24 show a damper 40 of another embodiment which is similar to that described in the first embodiment except for the arrangement of the ribs. Specifically, ribs in this embodiment extend obliquely from the inner ring to the outer ring. For example, as best shown in FIG. 22, each of the right upper and lower ribs, 35RU and 35RD, is extended so that it defines an acute angle B1 with the vertical line, while each of the left upper and lower ribs, 35LU and 35LD, is extended so that it define an acute angle B2 with the vertical line. The angles B1 and B2 may preferably be 45 degrees; however, the present invention is not limited thereto and they can be changed depending upon rigidity or natural frequencies required.

With this arrangement, the natural frequencies of the damper 40 with respect to the first to third directions can be varied simply by changing the angles B1 and B2. For example, by decreasing the angles B1 and B2, the natural frequencies of the damper 40 with respect to the second and first directions are increased and decreased, respectively. On the other hand, by increasing the angles B1 and B2, the natural frequencies with respect to the second and first directions are decreased and increased, respectively.

Figure 23:
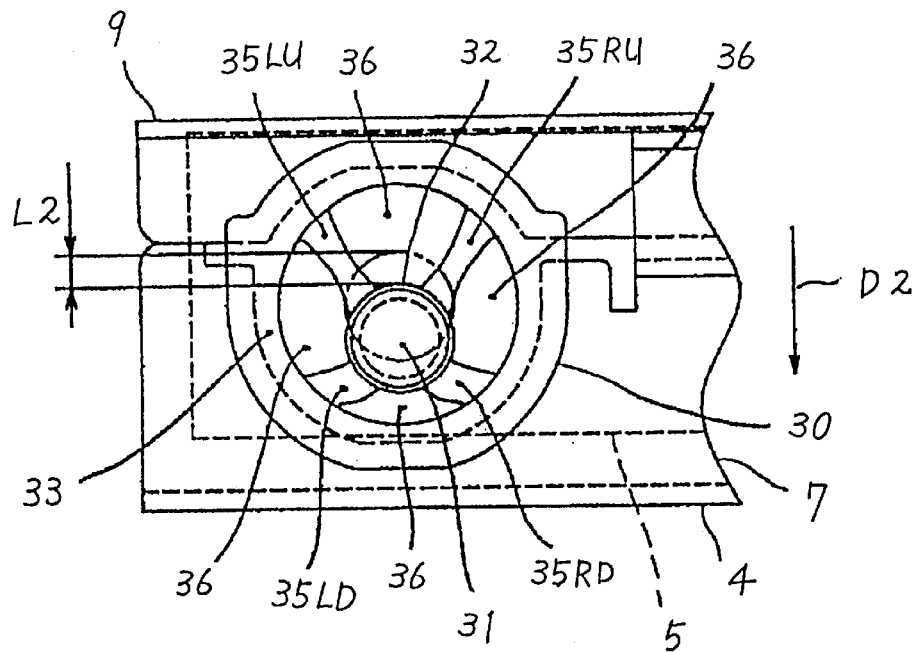
FIG. 23 is an enlarged partial side elevational view of the disk drive unit showing a deformation of the damper of the second embodiment when it suffers from vibrations and shocks with respect to the second direction.
Figure 24:
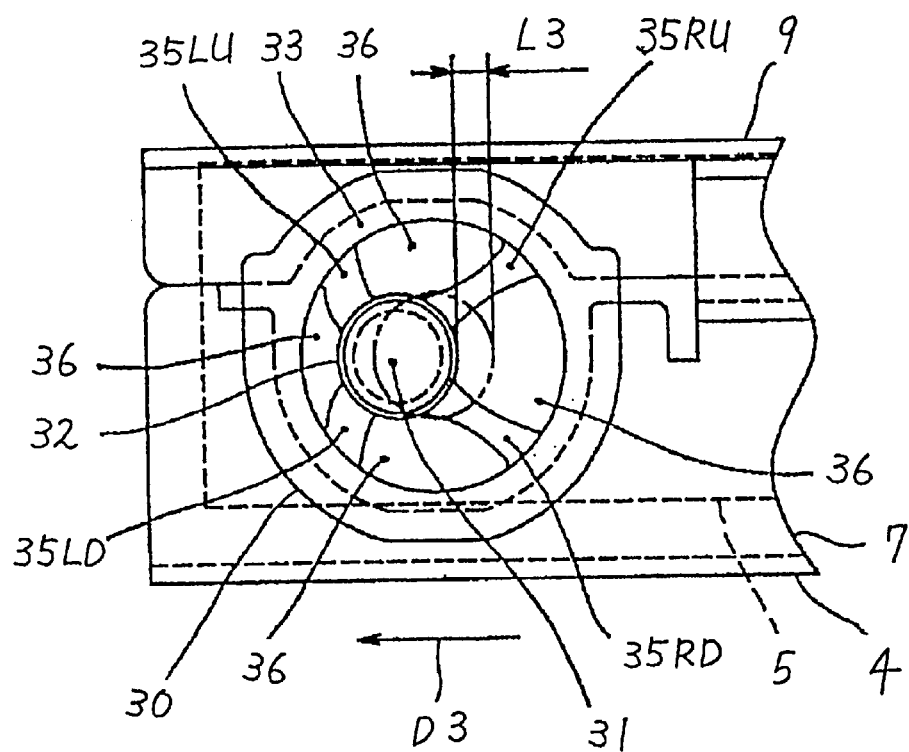
FIG. 24 is an enlarged partial side elevational view of the disk drive unit showing a deformation of the damper of the second embodiment when it suffers from vibrations and shocks with respect to the third direction.

Referring to FIGS. 23 to 24, a damping feature of the damper 40 will be described hereinafter. First, with respect to the first direction, the damper 40 shows the same behavior as that of the first embodiment For the vibrations and shocks exerted with respect to the second direction, as shown in FIG. 23, the ribs are stretched and compressed alternately and, when compressed, they are bent simultaneously. The webs 36 are also deformed so that they follow the deformation of the ribs.

The ribs and webs should be sized and configured so that they can elastically resist against forces derived from the vibrations and shocks and do not fall in the plastic zone. This ensures the positioning function of the ribs and webs.

Also, the obliquely extended ribs can reduce the stress generated in the damper when the damper suffers from the vibrations and shocks, which ensures the durability of the damper.

Further, since the obliquely extended ribs resist against forces exerted with respect to first to third directions by the stretching and compression and the bending thereof. This allows that the ribs can be designed to have a higher elasticity to resist against greater forces such as vibrations and shocks possibly exerted during driving on bumpy roads without any failure.

For the vibrations or shocks exerted with respect to the third direction, the ribs and webs function in the same manner as described above for the vibrations and shocks with respect to the second direction. Additionally, the ribs can resist well without any failure against forces exerted during insertion of the cartridge.

As described above, although the obliquely extended ribs have less resistance against the creep deformation caused by the constant load, they spread the force exerted by the external vibrations and shocks without causing any concentration thereof. This ensures that the damper with obliquely extended ribs will maintain its required damping feature for a long time.

In view of above, although the conventional oil damper requires a larger space for damping the external forces such as vibrations and shocks and therefore takes a longer time for stabilizing the optical head in position, the damper of the present invention needs a smaller space as well as less time for the damping and recovering operations by the damper.

Also, although the conventional dampers need other supporting members such as springs for the positive support of the movable frame, the damper of the present invention, by itself, can support the movable frame positively by its rigidity derived from the ribs.

Further, although the conventional dampers require a locking mechanism for holding the movable frame in position during insertion of the cartridge, the damper of the present invention does not need such mechanism.

Therefore, the present invention can provide a small and inexpensive disk drive unit. Also, the present invention can provide a disk drive unit durable against the external forces such as vibrations and shocks and those exerted during insertion of the disk cartridge.

The invention has been described in detail with particular reference to certain preferred embodiments thereof, but it will be understood that variations and modifications can be effected within the spirit and scope of the invention.

Figure 25:
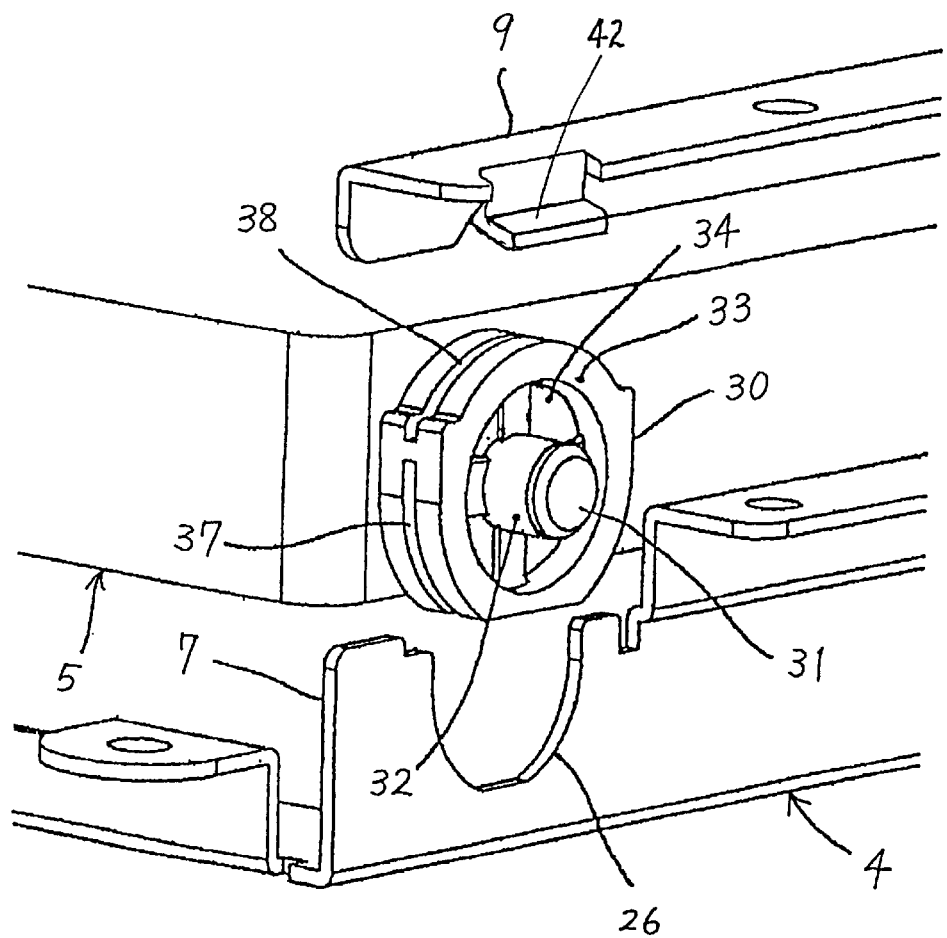
FIG. 25 is a perspective view of the disk drive unit of the third embodiment.

For, example, as shown in FIG. 25, the upper side wall portion 9 may be formed with a flange 42 that restricts the upward movement of the shaft and thereby prevents fatigue failure of the damper.

What is claimed is:

1. A disk drive apparatus, comprising:

(a) a fixed frame;
(b) a movable frame movably supported on said fixed frame for supporting a disk to be replayed, said movable frame including
a turntable for rotatably supporting said disk,
an optical head for optically reading information recorded in one surface of said disk supported on said turntable, and
a guide for moving said optical head in a radial direction of said supported disk;
(c) one or more supports, each of said supports having a damper made of elastic material for movably supporting said movable frame on said fixed frame, said damper being designed to have a damping feature so that said damper has a first natural frequency that is less than that of said optical head with respect to a first direction along which said optical head moves back and forth, a second natural frequency that is greater than that of said optical head with respect to a second direction perpendicular to said surface of said disk, and a third natural frequency that is greater than that of said optical head with respect to a third direction perpendicular to said first direction and parallel to said surface of said disk.

2. A disk drive apparatus in accordance with claim 1, wherein said support also has a shaft mounted in said movable frame and extending from said movable frame in said first direction and a bearing portion formed in said fixed frame for bearing said shaft through said damper, and said damper has an inner ring portion in which said shaft of said movable frame is inserted and held, an outer ring portion held by said bearing portion of said fixed frame, a plurality of radial ribs extending radially from said inner ring portion to said outer ring portion and connecting between said inner and outer ring portions.

3. A disk drive apparatus in accordance with claim 2, wherein said plurality of radial ribs include two ribs arranged on opposite sides of said inner ring portion and extending in said second direction and another two ribs arranged on opposite sides of said inner ring portion and extending in said third direction.

4. A disk drive apparatus in accordance with claim 2, wherein said plurality of radial ribs include four ribs arranged substantially at regular angles and extending obliquely to said second direction.

5. A disk drive apparatus in accordance with claim 2, wherein each of said ribs has substantially a rounded cross section.

6. A disk drive apparatus in accordance with claim 2, wherein said damper further includes webs, each extending between inner and outer ring portions and also neighboring one of said radial ribs, each of said webs having a thickness in said first direction smaller than that of said radial ribs.

7. A disk drive apparatus in accordance with claim 2, further including a restriction which restricts deformation of said damper to within a certain distance with respect to said second direction.

* * * * *